Figure 1:
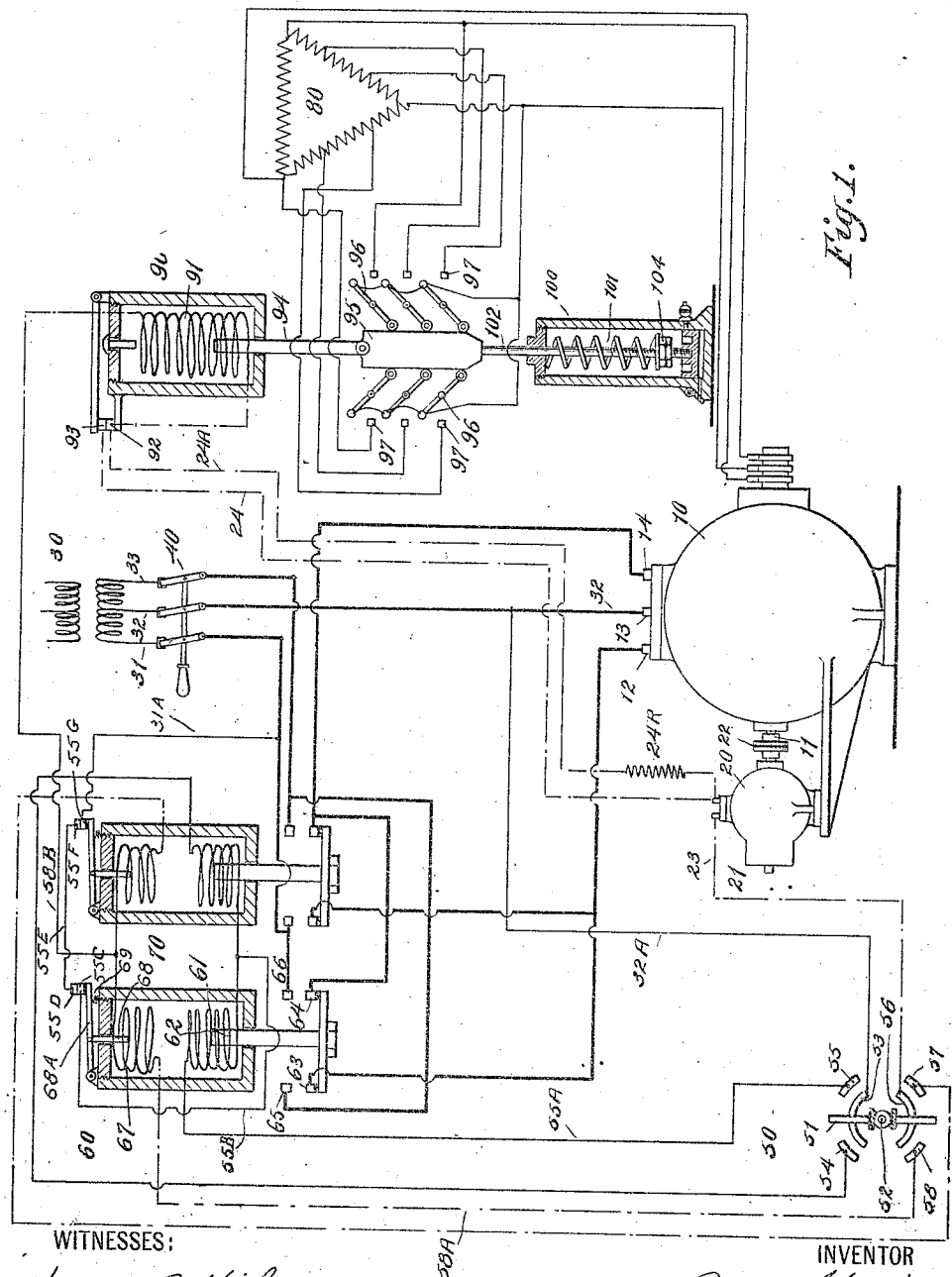

No. 816,805. PATENTED APR. 3, 1906.
A. MAGNUSON.
SYSTEM OF MOTOR CONTROL.
APPLICATION FILED JUNE 14, 1905.

2 SHEETS—SHEET 1.

WITNESSES:
Henry E. Kirby
Joseph E. Cavanaugh

INVENTOR
Axel Magnuson
BY
E. W. Marshall
ATTORNEY

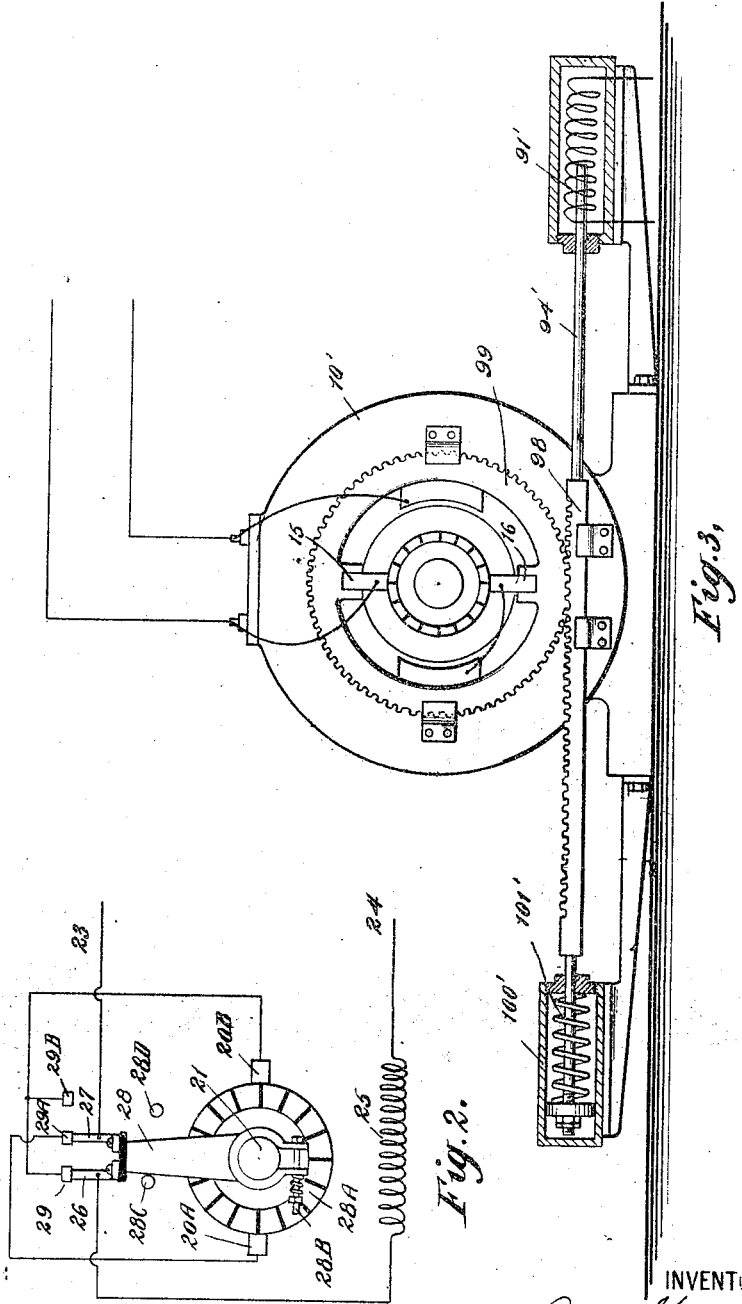

UNITED STATES PATENT OFFICE.

AXEL MAGNUSON, OF NEW YORK, N. Y., ASSIGNOR, BY MESNE ASSIGNMENTS, TO OTIS ELEVATOR COMPANY, OF JERSEY CITY, NEW JERSEY, A CORPORATION OF NEW JERSEY.

SYSTEM OF MOTOR CONTROL.

No. 818,805.  Specification of Letters Patent.  Patented April 3, 1906.

Application filed June 14, 1905. Serial No. 265,167.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, and otherwise controlled at will.

Although my system is applicable to other types of electric motors, it may be used to great advantage in conjunction with such motors as are operated by alternating currents.

I have made application for Letters Patent, Serial No. 241,592, filed January 18, 1905, for a system of motor control which embodies the broad idea of the present invention, and the present invention is of certain improvements and developments of the invention disclosed in said prior application.

Referring to the drawings, Figure 1 is a diagrammatic view of the various apparatus and circuits which I use in carrying out my invention. Fig. 2 is a diagram of one part of the apparatus with certain electrical circuits. Fig. 3 is an end elevation of an electric motor with a modification of my invention connected thereto.

Like characters of reference designate corresponding parts in all of the figures.

10 designates an electric motor which is to be controlled.

20 designates a generator which is connected to run with the motor and to be driven thereby. It may be directly connected to the motor by having its shaft 21 connected to the motor-shaft 11 by a coupling 22, as shown, or it may be connected in any other suitable manner.

30 is a transformer. Its primary may be connected to a suitable source of electrical supply. Its secondary is connected by the mains 31, 32, and 33 through a main switch 40 to the various parts of the apparatus, as will be shown later. 60 and 70 designate magnetically-actuated circuit-closers or starting-switches for the motor. Taken together they constitute a reversing-switch for starting the motor in either direction.

50 is a manually-operated switch which may be situated at any convenient place and by means of which an operator may control the movements of the motor at will. This switch comprises a two-part contact-arm 51, which is pivoted at 52 and which may be moved over to the left or right to connect a plate 53 with either contact-plate 54 or contact-plate 55. The contact-plate 53 is connected to the main 32 by a conductor $32^A$, and if the upper part of contact-arm 51 is moved to the right a circuit will be completed thereby through conductor $55^A$, magnet-winding 61, conductor $55^B$, contacts $55^C$ and $55^D$, which are together, conductor $55^E$, contacts $55^F$ and $55^G$, and conductor $31^A$ to the main 31. Magnet-winding 61 will therefore be connected across the mains 31 and 32, and a single-phase current will consequently pass through it. The magnet will thereby become energized and will lift its core 62 and its connected parts. Two movable contacts 63 and 64 are carried to but insulated from the core 62, and these will now be raised up against two stationary contacts 65 and 66. The motor-terminals 12 and 14 are connected to the movable contacts 63 and 64, respectively, and as the mains 33 and 31 are connected to contacts 65 and 66 these mains 33 and 31 will now be connected to motor-terminals 12 and 14, respectively. The other main 32 is connected directly to the central motor-terminal 13. The motor will now receive current from the mains and will begin to rotate. The generator 20 will now be driven by the motor and will generate a current of variable voltage proportional in strength to the speed of the motor. When the upper part of contact-arm 51 of switch 50 was moved to the right, the lower part was moved to the left, so that it now connects contact-plates 56 and 58. This will close a circuit across the mains of generator 20, which will include magnet-windings 67 and 91. I will now trace this circuit. Starting at the generator the circuit extends through conductor 23, contacts 56 and 58, which are now connected by contact-arm 51, thence through conductor $58^A$ to and through magnet-winding 67, thence through conductor $58^B$ to the solenoid-winding 91. From this winding the circuit returns to generator 20 by two paths: first, through contacts 92 and 93, which are now together, and by conductor 24, and, second, by conductor 24ᴬ through resistance 24ᴿ.

I will now describe the purpose and operation of the device shown above the magnetically-actuated switch 60.

68 designates a magnetic core, which may be suspended from a pivoted arm 68ᴬ. This arm is normally kept in a raised position to keep contacts 55ᶜ and 55ᴰ closed by means of a spring 69. As the speed of the motor and generator increases the strength of the generated current increases until it energizes magnet-winding 67 sufficiently for the latter to hold the core 62 in its raised position. The magnet-winding 67 will exercise a downward pull on the core 68 and will overcome the effect of spring 69, pull contacts 55ᶜ and 55ᴰ apart, and thereby cut off the alternating current from magnet-winding 61 when the latter is no longer needed to hold up the core 62. If the manually-operated switch 50 had been moved in the other direction, the operation would have been similar; but in this case the magnetically-actuated switch 70 would have been closed and the mains 31, 32, and 33 would have been connected to the motor-terminals 12, 13, and 14, respectively, and the motor would rotate in the opposite direction.

It will be noted that in the diagram an opposition element in the form of a delta-connected resistance 80 is connected to the rotor of the motor. This opposition element may be inductance or resistance or any other desired means for preventing the motor from getting full power from the line. As long as it is in the motor-circuit the rotation of the motor will be slow. One of the objects of the present invention is to provide means for automatically and gradually cutting this opposition element out of the motor-circuit, and thereby controlling the acceleration of the motor in starting. I will now describe the means I employ to obtain this result.

It has already been shown that the current from generator 20 passes through a magnet-winding 91. This is a part of a controlling device 90. When the variable voltage from the generator 20 passes through this winding, it energizes the latter and causes it to exercise an upward pull on a core 94, which will be proportional to the speed of the motor. This upward pull may be opposed by a dash-pot 100 of ordinary construction and by a spring 101. The spring may be adjusted by nuts 104. Between the core 94 and the piston-rod 102 of the dash-pot a cam member is interposed. When the parts are in the position shown in the drawings, this cam member 95 holds a number of pivoted contact-arms 96 96 away from a corresponding number of stationary contacts 97 97. When the cam member is raised by the action of the solenoid, it allows, first, the lower pair of these pivoted contact-arms 96 to drop down against their stationary contacts 97, then the second pair of contact-arms to move against their stationary contacts, and so on. These pivoted contact-arms and their corresponding stationary contacts are so connected to the opposition element that they short-circuit the latter in a number of steps, and thereby gradually remove it from the rotor-circuit and allow the motor to accelerate until it reaches full speed. As this action depends upon the value of the variable voltage of the generator 20 and as this value depends upon the speed of the controlled motor, it is evident that the motor's acceleration will be automatically controlled in the desired manner—that is, the motor will be brought up to full speed slowly when it is driving heavy loads and more rapidly with lighter loads.

The solenoid 91 may be arranged to control the motor in a number of ways. I have just described it as arranged to control an opposition element in the motor-circuit, as this is a common type of motor-controlling devices. It may be used to actuate an automatic transformer or other devices or to control a motor by shifting its brushes. Such an arrangement is shown in Fig. 3. Here the solenoid 91' has its core 94' connected to a rack 98, which meshes with a gear 99. The action of the solenoid may be retarded by a dash-pot 100' and a spring 101'. The motor 10' is shown as a series motor with its brushes 15 and 16 connected to the gear 99, and its acceleration and even its direction of rotation may be controlled by shifting the position of its brushes by means of the solenoid 91'.

The generator 20 may be a magneto, a shunt-wound dynamo, a series-wound dynamo, or any other desired type. In the drawings, Fig. 2, I have shown it as a magneto with a series winding on its fields to keep up their magnetism. The fields then are permanently charged, and the variable voltage depends upon the speed of the armature's rotation between them. In Fig. 2 I show an arrangement for causing its generated current to flow in the same direction regardless of the direction of rotation of the generator. In this view, Fig. 2, an arm 28 is shown, the lower end of which is supported by the armature-shaft 21 and is pressed against the shaft by a spring 28ᴬ, the tension of which may be adjusted by a nut 28ᴮ. The other end of the arm carries two contact-pieces 26 and 27, which are insulated from each other and from the arm 28. The outgoing conductor 23 is connected to contact-piece 27 and contact-piece 26 is connected to one end of the series field. The other outgoing conductor is connected to the other end of the series field. Contact-pieces 26 and 27 rest upon stationary contacts 29 and 29ᴬ, respectively, as shown, or else upon stationary contacts 29ᴬ and 29ᴮ, respectively. The armature-brush 20ᴬ is connected to stationary contact 29ᴬ, and the armature-brush 20ᴮ is connected to the other two stationary contacts 29 and 29ᴮ. When the motor 10 drives the shaft 21 to the left, the arm 28 and contact-pieces 26 and 27 will remain in the position shown, with arm 28 resting against a stop 28ᶜ; but when the shaft 21 is rotated to the right the arm 28 and the contact-pieces will be carried over thereby until the arm reaches the stop 28ᴰ, when contact-piece 26 will rest upon stationary contact 29ᴬ and contact-piece 27 will rest upon stationary contact 29ᴮ. This will cause a reversal of connections between the armature and fields and will cause the generated current to flow in the same direction through the fields of the generator and its outgoing conductors regardless of the direction of rotation of the shaft 21.

This system is capable of many modifications and applications. It is applicable to many types of motors and to various kinds of controlling devices. It is applicable to electric elevators and to the control of electric-railway cars. I therefore do not wish to limit myself to the specific apparatus and applications herein shown and described.

What I claim is—

1. A motor, a source of pulsating current therefor, a direct-current generator driven by the motor, a starting-switch for the motor, a single magnet for actuating the starting-switch, said magnet being energized by pulsating and direct currents, and means dependent upon the generator for controlling the motor.

2. A motor, a source of pulsating current therefor, a direct-current generator diven by the motor, a reversing-switch for the motor, magnets for actuating the reversing-switch, said magnets each having a single frame and being energized by pulsating and direct currents, and means dependent upon the generator for controlling the motor.

3. A motor, a source of pulsating current therefor, a direct-current generator driven by the motor, a starting-switch for the motor, a magnet for actuating the starting-switch, said magnet being energized by pulsating and direct currents, and means dependent upon the generator for controlling the motor.

4. A motor, a source of pulsating current therefor, a direct-current generator driven by the motor, a reversing-switch for the motor, magnets for actuating the reversing-switch, said magnets being energized by pulsating and direct currents, and means dependent upon the generator for controlling the motor.

5. A motor, a source of pulsating current therefor, a direct-current generator driven by the motor, a reversing-switch for the motor, magnets for actuating the reversing-switch, said magnets having two windings, one for pulsating and the other for direct currents, and means dependent upon the generator for controlling the motor.

6. A motor, a source of pulsating current therefor, a direct-current generator driven by the motor, a reversing-switch for the motor, magnets for actuating the reversing-switch, said magnets being energized by pulsating and direct currents, and means actuated by the magnet for cutting off the pulsating current from the magnet while the motor is running.

7. A motor, a source of pulsating current therefor, a direct-current generator driven by the motor, a starting-switch for the motor, a magnet for actuating the starting-switch, said magnet being energized by pulsating and direct currents, means actuated by the magnet for cutting off the pulsating current from the magnet while the motor is running, and means dependent upon the generator for controlling the motor.

8. A motor, a source of pulsating current therefor, a direct-current generator driven by the motor, a starting-switch for the motor, a magnet for actuating the starting-switch, said magnet being energized by pulsating and direct currents, means dependent upon the generator for controlling the motor, and a manually-operated circuit-closer for controlling both the pulsating and direct currents in the magnet.

9. A motor, a source of pulsating current therefor, a direct-current generator driven by the motor, a reversing-switch for the motor, magnets for actuating the reversing-switch, said magnets being energized by pulsating and direct currents, means dependent upon the generator for controlling the motor, and a manually-operated circuit-closer for controlling both the pulsating and direct currents in the magnets.

10. A motor, a source of pulsating current therefor, a direct-current generator driven by the motor, a reversing-switch for the motor, magnets for actuating the reversing-switch, said magnets being energized by pulsating and direct currents, means actuated by the magnets for cutting off the pulsating current from the magnet while the motor is running, means dependent upon the generator for controlling the motor, and a manually-operated circuit-closer for controlling both the pulsating and direct currents in the magnets.

11. A motor, a source of pulsating current therefor, a generator driven by the motor and arranged to produce a direct current proportional in strength to the speed of the motor, a reversing-switch for starting the motor in either direction, magnets for actuating the reversing-switch, said magnets being energized by the pulsating and direct currents, and means actuated by the direct current for cutting off the pulsating current from the magnet when the direct current reaches a predetermined strength.

12. A motor, a source of pulsating current therefor, a generator driven by the motor and arranged to produce a direct current proportional in strength to the speed of the motor, a reversing-switch for starting the motor in either direction, magnets for actuating the reversing-switch, said magnets being energized by the pulsating and direct currents, means actuated by the direct current for cutting off the pulsating current from the magnet when the direct current reaches a predetermined strength, and a manually-operated circuit-closer for controlling both the pulsating and direct currents in the magnets.

13. A motor, a source of pulsating current therefor, a direct-current generator driven by the motor, a reversing-switch for the motor, magnets for actuating the reversing-switch, each of said magnets having two windings one for pulsating and the other for direct currents, and a single-magnet frame and means dependent upon the generator for controlling the motor.

14. A motor, a controlling device therefor, a generator driven by the motor, and a solenoid in circuit with the generator arranged to gradually actuate the controlling device in proportion to the speed of the motor.

15. A motor, a controlling device therefor comprising a plurality of circuit-closers, a generator driven by the motor, and a solenoid in circuit with the generator arranged to actuate the circuit-closers step by step in proportion to the speed of the motor.

16. A motor, a controlling device therefor, a generator driven by the motor, a solenoid in circuit with the generator arranged to gradually actuate the controlling device in proportion to the speed of the motor, and a retarding device for the solenoid.

17. A motor, a controlling device therefor, a generator driven by the motor, a solenoid in circuit with the generator arranged to gradually actuate the controlling device in proportion to the speed of the motor, and an adjustable retarding device for the solenoid.

18. A motor, a controlling device therefor, a generator driven by the motor, a solenoid in circuit with the generator arranged to gradually actuate the controlling device in one direction in proportion to the speed of the motor, and means to actuate the controlling device in the other direction.

19. A motor, a controlling device therefor, a generator driven by the motor, a solenoid in circuit with the generator arranged to gradually actuate the controlling device in one direction in proportion to the speed of the motor, and adjustable means to actuate the controlling device in the other direction.

20. A motor, a controlling device therefor, a generator driven by the motor, an electromagnetic actuator for the controlling device, and means actuated by the controlling device for weakening the current of the generator.

21. A motor, a starting-switch and a controlling device therefor, a generator driven by the motor, an electromagnetic actuator for the controlling device, and means actuated by the controlling device for weakening the current of the generator.

22. A motor, a magnetically-actuated starting-switch therefor, a controlling device for the motor, an electromagnetic actuator for the controlling device, a source of current-supply depending on the movement of the motor and arranged to produce a current proportional in strength to the speed of the motor for actuating the electromagnetic devices, and means actuated by the controlling device for weakening said current after the motor has reached a pretermined speed.

23. A motor, two sources of electrical energy, one of which is pulsating and practically constant in value and is conducted to the motor, the other of which is direct and proportional in strength to the speed of the motor, and a solenoid connected to said second source of energy and arranged to gradually control the acceleration of the motor in starting.

24. A motor, two sources of electrical energy, one of which is pulsating and practically constant in value and is conducted to the motor, the other of which is direct and proportional in strength to the speed of the motor, a solenoid connected to said second source of energy and arranged to gradually control the acceleration of the motor in starting, and a manually-operated circuit-closer arranged to control both sources of electrical energy.

25. A motor, a starting-switch therefor, two sources of electrical energy, one of which is pulsating and practically constant in value and is conducted to the motor, the other of which is direct and proportional in strength to the speed of the motor, and a solenoid connected to said second source of energy and arranged to gradually control the acceleration of the motor in starting.

26. In a system of motor control, an alternating-current motor, a starting device therefor, two sources of electrical energy, one of which is pulsating and practically constant in value and is conducted to the motor, the other of which is direct and proportional in strength to the speed of the motor, a solenoid connected to said second source of energy and arranged to gradually control the acceleration of the motor, and a manually-operated master-switch for controlling the system.

27. A motor, a source of current therefor, a magneto driven by the motor and arranged to generate a current proportional in strength to the speed of the motor, and motor-controlling apparatus separate from the field-windings but connected to said magneto to be operated by the current therefrom.

28. A motor, a source of current therefor, a magneto having permanently-magnetized fields, said magneto being driven by the motor and arranged to generate a current proportional in strength to the speed of the motor, and motor-controlling means separate from the field-windings but connected to said magneto to be operated by the current therefrom.

29. A motor, a source of current therefor, a magneto having permanently-magnetized fields and a field-winding, said magneto being driven by the motor and arranged to generate a current proportional in strength to the speed of the motor, and motor-controlling means separate from the field-windings but connected to said magneto to be operated by the current therefrom.

30. A motor, a source of current therefor, a magneto having permanently-magnetized fields and a field-winding, means for insuring the generated current flowing through said field-winding in the same direction regardless of the direction of rotation of the magneto, said magneto being driven by the motor and arranged to generate a current proportional in strength to the speed of the motor, said current arranged to control the movement of the motor.

31. A motor, a starting device, a motor-controlling device separate from the motor field-windings, a source of electrical supply for the motor, a magneto driven by the motor and arranged to generate a current proportional in strength to the speed of the motor, and connections between said magneto and said motor-controlling device.

32. A motor, a starting device and a controlling device therefor, a source of electrical supply for the motor, a magneto driven by the motor and arranged to generate a current proportional in strength to the speed of the motor, said current arranged to control the starting and controlling devices for the motor, and a manually-operated circuit-closer to control the generated current of the magneto.

33. A motor, a starting device and a controlling device therefor, a source of electrical supply for the motor, a magneto driven by the motor and arranged to generate a current proportional in strength to the speed of the motor, said current arranged to control the starting and controlling devices for the motor, and means actuated by the controlling device for weakening the generated current of the magneto after the motor has reached a predetermined speed.

In testimony whereof I have signed my name to this specification in the presence of two subscribing witnesses.

AXEL MAGNUSON.

Witnesses:
 ERNEST W. MARSHALL,
 JOSEPH E. CAVANAUGH.